United States Patent [19]

DuPont

[11] Patent Number: 4,555,588
[45] Date of Patent: Nov. 26, 1985

[54] HEAT TRANSFER DEVICE FOR ELECTRICAL CONNECTOR IN INSULATING HOUSING OF HIGH VOLTAGE SPLICE OR TERMINATOR

[75] Inventor: John P. DuPont, Waukesha, Wis.

[73] Assignee: RTE Corporation, Waukesha, Wis.

[21] Appl. No.: 545,800

[22] Filed: Oct. 26, 1983

[51] Int. Cl.[4] .................. H02G 15/064; H02G 15/184
[52] U.S. Cl. .................................. 174/73 R; 165/185;
174/16 HS
[58] Field of Search ............ 174/16 HS, 73 R, 73 SC;
338/51; 339/112 R, 143 R, 143 L; D13/24

[56] References Cited

U.S. PATENT DOCUMENTS

| | | | |
|---|---|---|---|
| 3,691,291 | 9/1972 | Taj ...................................... | 174/73 R |
| 3,829,600 | 8/1974 | Portinari et al. ................... | 174/73 R |
| 4,079,189 | 3/1978 | Troccoli ............................. | 174/73 R |
| 4,192,964 | 3/1980 | Sacks ................................. | 174/73 R |

*Primary Examiner*—Laramie E. Askin
*Attorney, Agent, or Firm*—Raymond E. Fritz, Jr.

[57] ABSTRACT

The insulating housing of a high voltage splice or terminator for a high voltage electrical distribution system comprises a connector cavity defined by a hollow electrically conductive stress relief insert and at least one or more cable-receiving passages communicating with the connector cavity. A stripped electrical conductor at the end of a cable extends through the passage and is electrically and mechanically joined to a metal electrical connector in the cavity as by crimping. A hollow elastomeric electrically conductive and thermally conductive heat transfer device, split along one side to enable it to be slipped into the electrical connector, makes snug electrical and thermal engagement with the exterior of the connector and has integrally formed radially outwardly extending spaced apart resilient projections on its outer surface for making tight electrical and thermal engagement with the interior surface of the hollow stress relief insert of the housing. The device efficiently transfers excessive and damaging heat from the connector to the housing for dissipation to atmosphere.

8 Claims, 8 Drawing Figures

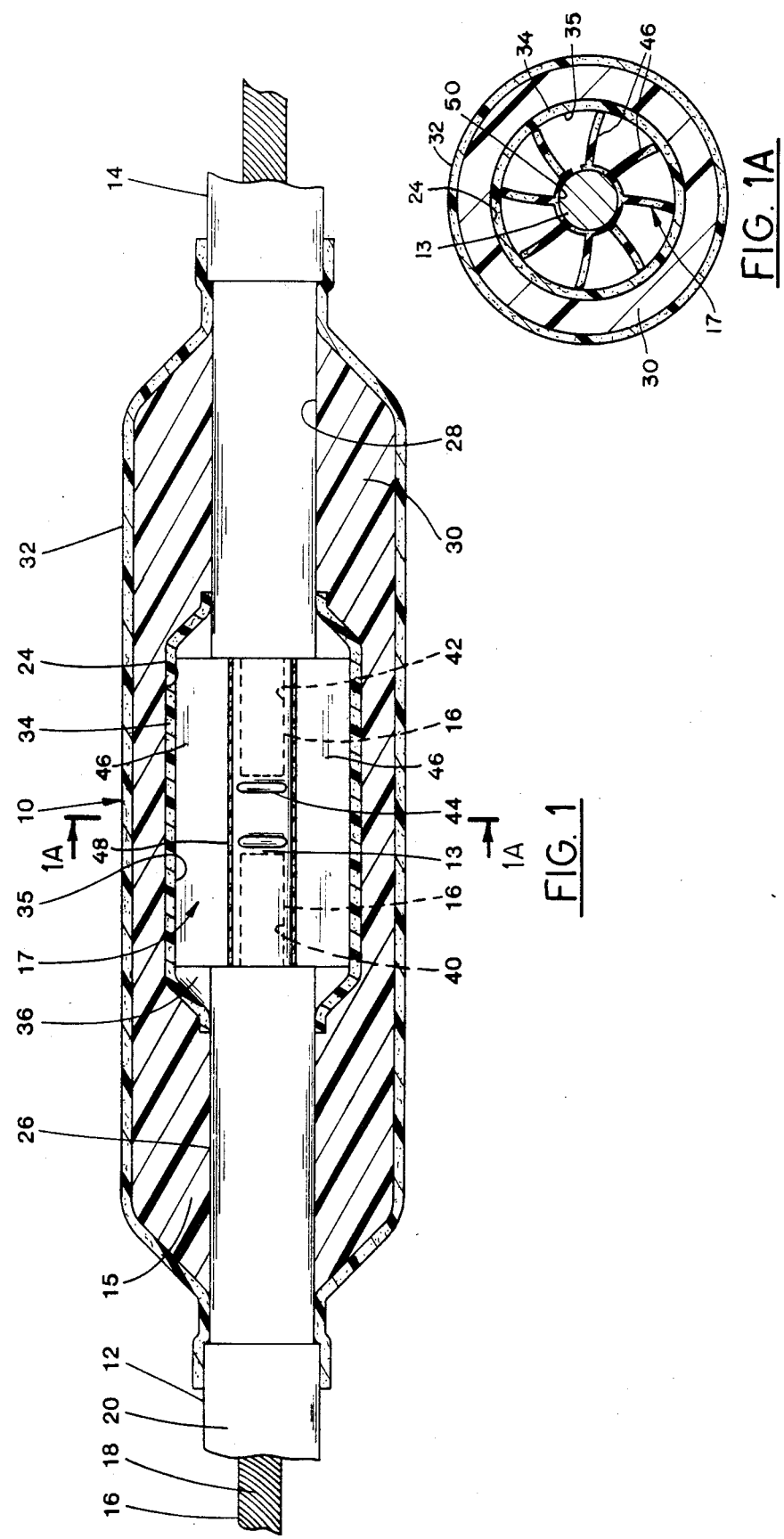

HEAT TRANSFER DEVICE FOR ELECTRICAL CONNECTOR IN INSULATING HOUSING OF HIGH VOLTAGE SPLICE OR TERMINATOR

BACKGROUND OF THE INVENTION

1. Field of Use

This invention relates generally to components, such as splices, elbows or terminators, which are used for splicing or terminating electric cables used in high voltage electrical power transmission and distribution systems.

In particular it relates to heat transfer devices for transferring heat from a cable connector located within an insulating housing in such a component to the housing for dissipation therefrom to atmosphere.

2. Description of the Prior Art

High voltage electrical systems of the aforesaid character employ relatively large cables which need to be spliced together end-to-end or need to have a cable end connected to a terminal on electrical apparatus such as a transformer, circuit breaker or the like. The cable typically comprises an electrical conductor (usually formed of multiple strands of wire), an electrical insulating sheath surrounding the electrical conductor, a semiconductor sheath surrounding the insulation, and electrical shielding (usually formed by woven wire) surrounding the insulating sheath. Cable splicing or cable termination requires use of a component, such as a splice or elbow or terminator, which can withstand high voltage and high temperature and is mechanically strong.

Such a high voltage component typically comprises an electrically insulating housing having a connector cavity therein which is accessible through at least one cable-receiving passage extending into the housing. The cavity is defined or surrounded by an electrically conductive hollow stress relief insert closely connected as by bonding to the insulating material of which the housing is made. In a finished installation a metal electrical connector is located within the stress relief insert and the end of a cable extends through a cable-receiving passage into the hollow stress relief insert and the stripped conductor is electrically and mechanically joined to the electrical connector as by crimping. In a splicing component the ends of two cables extend into the housing and are joined end-to-end to the connector. In an elbow or terminator the end of only one cable extends into the housing and is joined to the connector which has a terminal attached thereto. In operation, electrical current flow through the electrical connector (which can range from 20 to up to 600 amperes, depending on the size of the system) can cause relatively high temperatures at the connector and in the housing cavity due to the electrical resistance in the connector joint. Such heating can cause or accelerate deterioration (i.e., "aging") of the dielectric and nondielectric organic materials of which the housing and cable insulation are made and can create a risk of mechanical failure, electrical breakdown or flashover and even fire.

The prior art discloses various means and measures which can be employed to dissipate the heat from the connector and the housing cavity. Thus, in some components, for example, the stress relief insert in the housing cavity is constructed with one or more integrally formed inwardly extending flexible projections which physically engage the connector and transfer heat therefrom to the housing for dissipation to atmosphere. U.S. Pat. No. 4,079,189 discloses a component, such as a cable splice, employing such a stress relief insert. However, such projections can make it difficult to slip the cable(s) and the attached connector through the housing passage into the hollow stress relief insert defining the cavity after splicing is accomplished. Another approach is to make the housing of sufficiently large mass relative to expected temperatures so as to enable the housing to absorb and dissipate connector and cavity heat rapidly enough to keep temperatures low and minimize deterioration. However, this can result in unduly large and costly housings. Still another approach is shown in U.S. Pat. No. 3,691,291 wherein a metal connector is provided with metal collars which are threadedly mounted thereon and which engage the stress relief insert surrounding the connector cavity to transfer heat to the housing for dissipation. The metal collars enlarge the surface contact area between the connector and cavity wall. However, this component may be difficult and time consuming to assemble, is rigid and is relatively costly.

SUMMARY OF THE PRESENT INVENTION

In accordance with the present invention, there are provided improved heat transfer devices for transferring heat from a cable connector to an insulating housing in which it is located in a component, such as a splice or elbow or terminator, used in a high voltage electrical system.

Devices in accordance with the invention are employed in a high voltage component which comprises an electrically insulating housing having a connector cavity therein which is accessible through one or more cable-receiving passages extending into the housing. The cavity is defined or surrounded by an electrically conductive hollow stress relief insert closely connected as by bonding to the insulating material of which the housing is made. In a finished installation a metal electrical connector of substantially smaller outside diameter than the inside diameter of the cavity is located within the stress relief insert and is connected to a bare electrical conductor at an end of one or more cables. In a splicing component the housing is provided with two axially aligned cable-receiving passages which communicate with the interior of the hollow stress relief insert. Each cable-receiving passage accommodates a cable and the bare ends of the cable conductors are electrically and mechanically connected in end-to-end relationship to the connector as by crimping, set screws or other means. In a terminator component, such as an elbow or the like, the housing is provided with a single cable-receiving passage which communicates with the interior of the hollow stress relief insert. The passage accommodates a cable and the bare end of the cable conductor is electrically and mechanically connected to the connector as by crimping, set screws or the like. The connector is also connected to a terminal member within the housing.

A device in accordance with the invention in its broadest aspect takes the form of an electrically and thermally conductive hollow elastic member surrounding and engaging the electrical connector located within the hollow stress relief insert in the housing and having radially outwardly extending spaced apart projections on the exterior thereof which engage the walls of the stress relief insert. The device includes a bore open at both ends extending therethrough for accommodating the electrical connector in tight or snug engagement. The device includes a slit extending axially along and through a side thereof for the entire length of the bore to enable the device to be temporarily expanded and slipped onto the connector laterally. Thus, the device is in the form of a sleeve split lengthwise. In one embodiment the exterior projections take the form of a plurality of fins which extend lengthwise of the device and are circumferentially spaced apart from each other. In a second embodiment the exterior projections take the form of a plurality of rings which extend circumferentially around the device and are axially spaced apart from each other along the length of the device. In third and fourth embodiments the exterior projections take the form of a plurality of fingers spaced apart from each other and either regularly or randomly arranged around the device.

The device is fabricated of elastic or elastomeric material which is flexible enough to snap easily but snugly over the connector and to conform closely to the connector shape. The material may, for example, comprise rubber in which electrically conductive particles of carbon black are suspended or embedded so as to provide electrical and thermal conductivity between the connector and the electrically conductive stress relief insert of the housing.

An elastic or elastomeric heat transfer device in accordance with the invention offers several advantages over the prior art. For example, it is easily snapped onto the connector before the latter is drawn into and through the housing passage and into the connector cavity defined by the hollow stress relief insert. The outwardly extending projections are flexible and can be displaced radially inwardly so as to lie flat to facilitate movement of the device through the passage in the housing but resume their outwardly extending position when in final position in the cavity. The device makes positive snug physical engagement both with the connector and insert to ensure good electrical and thermal conductivity. The device is relatively simple and economical to manufacture and is reliable in use. Other objects and advantages of the invention will hereinafter appear.

DRAWINGS

FIG. 1 is a cross-section view of a high voltage component, such as a splice, of two electrical cables, an electrical connector, and a first embodiment of a heat transfer device in accordance with the invention associated with the component;

FIG. 1A is a cross-section view taken on line 1A—1A of FIG. 1;

DESCRIPTION OF PREFERRED EMBODIMENTS

Figure 3:
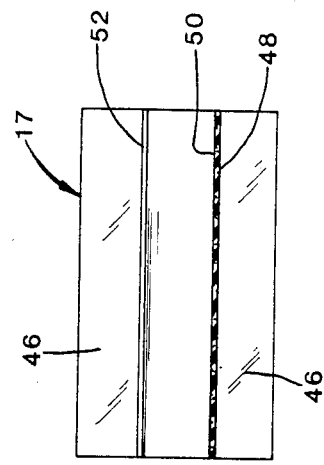
FIG. 3 is a cross-section view taken on line 3—3 of FIG. 2.
Figure 4:
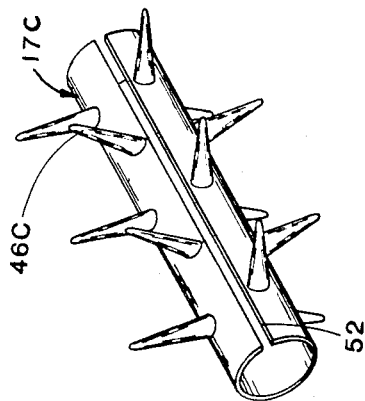
FIG. 4 is a cross-section view taken on line 4—4 of FIG. 3.
Figure 2:
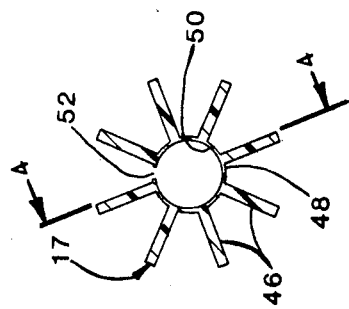
FIG. 2 is an enlarged perspective view of the heat transfer device of FIG. 1.

Referring to FIG. 1, the numeral 10 designates a component, such as a splice component, which is used in a high voltage electrical distribution system to electrically and mechanically connect together two high voltage electrical cables 12 and 14 by means of an electrical connector 13 which is disposed within a housing 15 of component 10. A heat transfer device 17 in accordance with a first embodiment of the invention is shown in association with connector 13 in FIG. 1.

Each cable 12, 14 comprises a flexible electrical conductor 16 formed of a plurality of strands of wire 18 and a flexible electrical insulating sheath 20 surrounding the conductor 16. Each electrical cable 12, 14 will be provided with electrical shielding (not shown) around the insulating sheath 20 when it is used for power applications. In FIG. 1 each cable 12, 14 has a portion of the sheath 20 removed or stripped from the end thereof to expose an end portion of conductor 16 for connection to connector 13.

Splice component 10 comprises insulating housing 15 which has a cylindrical cavity 24 therein, which cavity is accessible from the exterior of the housing through cylindrical cable-receiving passages 26 and 28 formed in housing 15 and axially aligned with each other. Cavity 24 is of greater diameter than the passages 26 and 28. Housing 15 comprises an interior body portion 30 which is fabricated of resilient, compressible, elastic electrical insulating or dielectric material such as rubber or a suitable elastomeric compound. Body 30, which has a generally hollow cylindrical form, is provided on the exterior thereof with an electrically conductive hollow stress relief shell 32 and is provided in the cavity 24 with an electrically conductive hollow stress relief insert 34 which defines a connector cavity 36. The shell 32 and insert 34 are each made of relatively flexible electrically conductive material such as rubber or other elastomeric material in which electrically conductive material such as carbon black is suspended. The shell 32 and insert 34 are firmly connected to body 30 as being adhesively bonded thereto.

Electrical connector 13 takes the form of a generally cylindrical metal member, preferably formed of malleable high conductivity copper or aluminum, which initially has cylindrical recesses 40 and 42 which extend axially inwardly from opposite ends of the connector and are adapted to receive the exposed end portions of the conductors 16 of the cables 12 and 14, respectively. Connector 13 is crimped by a suitable tool (not shown) so as to deform it and electrically and mechanically connect it firmly to the conductors 16. Connector 13 is shown deformed in FIG. 1 and has indentations 44 in the exterior surface thereof. However, connector 13 could be attached to the conductor 16 in some other manner, as by set screws (not shown). Connector 13 is of substantially smaller outside diameter than the inside diameter of cavity 36 but is nearly of the same length as the widest portion of insert 34.

As FIGS. 1, 1A, 2, 3 and 4 show, the heat transfer device 17 in accordance with a first embodiment of the invention takes the form of an electrically and thermally conductive hollow elastic member discrete from said housing 15 and surrounding and engaging the electrical connector 13 located within cavity 36 of the hollow stress relief insert 34 in the housing 15 and having radially outwardly extending spaced apart projections 46 on the exterior surface 48 thereof which engage the walls 35 of the stress relief insert 34. The device 17 includes a bore 50 open at both ends extending therethrough for accommodating the electrical connector 13 in tight or snug engagement. The device 17 includes a slit 52 extending axially along and through a side thereof for the entire length of the bore 50 to enable the device to be temporarily expanded and slipped onto the connector 13 laterally. Thus, the device 17 is in the form of a sleeve split lengthwise and having flexible projections 46.

In the embodiment shown in FIGS. 1, 2, 3 and 4 the exterior projections 46 take the form of a plurality of fins which extend lengthwise of the device and are circumferentially spaced apart from each other. FIG. 1A shows the projections 46 bent.

Figure 5:
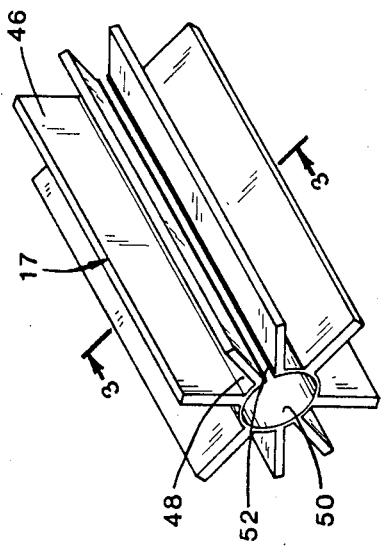
FIG. 5 is a perspective view of a second embodiment of a heat transfer device in accordance with the present invention.

In a second embodiment of the device 17A shown in FIG. 5 the exterior projections 46A take the form of a plurality of flexible rings which extend circumferentially around the device 17A and are axially spaced apart from each other along the length of the device. Slit 52 extends the length of device 17A.

Figure 6:
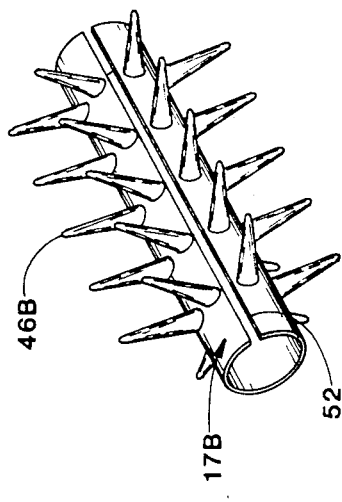
FIG. 6 is a perspective view of a third embodiment of a heat transfer device in accordance with the present invention.
Figure 7:
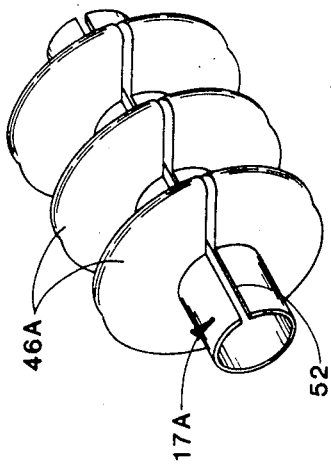
FIG. 7 is a perspective view of a fourth embodiment of a heat transfer device in accordance with the present invention.

In third and fourth embodiments of the device, shown in FIGS. 6 and 7 and designated 17B and 17C, respectively, the exterior projections 46B and 46C, respectively, take the form of a plurality of flexible fingers spaced apart from each other and either regularly (FIG. 6) or randomly (FIG. 7) arranged around the device. Each device 17B, 17C includes a slit 52 which extends the length of the device.

Each device 17, 17A, 17B, 17C is fabricated of elastic or elastomeric material which is flexible enough to snap easily but snugly over the connector 13 and to conform closely to the connector shape even though the latter is crimped and deformed. The material may, for example, comprise rubber in which electrically conductive particles of carbon black are suspended or embedded so as to provide electrical and thermal conductivity between the connector 13 and the electrically conductive stress relief insert 34 of the housing 15.

FIG. 1 shows the various elements which form the splice in finally assembled relationship. However, it is to be understood that the splice is formed as follows. First, one of the prestripped cables 12, 14 is inserted entirely through both passages 26 and 28 and the cavity 36 in insert 34 of housing 15. The prestripped ends of 12 and 14 are inserted into the recesses 40 and 42 in the connector 13 and the latter is crimped. The heat transfer device 17 (or any one of those others disclosed herein) is then separated along the slit 52 therein and snapped around the connector 13. Finally, the housing 15 is axially shifted or slid along the cable 12 or 14 on which it was initially disposed and the connector 13 with the device 17 thereon is slid through the passage 26 or 28 into the cavity 36. As device 17 is drawn through a passage 26 or 28 the projections 46 thereon, which are flexible and resilient, bend toward the surface 48 of device 17 until they reach the cavity 36, whereupon the projections spring outwardly and firmly engage the wall 35 of insert 34 of cavity 36, although they remain slightly bent so as to ensure good contact with the wall 35 of stress relief insert 34.

In a typical actual embodiment of the invention, the housing 15 is about 16 inches long; the outside diameter of each cable 12, 14 is about 1½ inches; the connector 13 is about 3½ inches long and initially 1 inch in diameter; the cavity 36 is about 2 inches in diameter between opposite sides of wall 35; and the device 17 is about 3½ inches long, has an uncompressed inside diameter of about ¾ of an inch and has an uncompressed outside diameter of about 2¼ inches.

I claim:

1. In combination in a high voltage component such as a splice, terminator, elbow or the like:
an electrically insulating housing having a cavity therein and at least one passage in said housing communicating with said cavity;
a hollow electrically conductive stress relief insert in said cavity and connected to said insulating housing;
an electrical connector located within said hollow stress relief insert;
an electrical cable extending through said passage into said hollow stress relief insert and having an electrical conductor electrically and mechanically connected to said electrical connector;
and an electrically and thermally conductive hollow elastic heat transfer device discrete from said housing and surrounding and engaging said electrical connector and having radially outwardly extending spaced apart projections on the exterior thereof engaging said stress relief insert.

2. A combination according to claim 1 wherein said heat transfer device includes a slit extending axially along and through a side thereof to enable said device to be disposed around said connector.

3. A combination according to claim 1 or 2 wherein said projections take the form of fins which extend lengthwise of said device and are circumferentially spaced apart from each other.

4. A combination according to claim 1 or 2 wherein said projections take the form of rings which extend radially around said device and are axially spaced apart from each other.

5. A combination according to claim 1 or 2 wherein said projections take the form of fingers spaced apart from each other.

6. A combination according to claim 5 wherein said fingers are regularly arranged on said device.

7. A combination according to claim 5 wherein said fingers are randomly arranged on said device.

8. In combination in a high voltage component such as a splice:
an electrically insulating housing having a cavity therein and a pair of axially aligned passages in said housing communicating with said cavity;
a hollow electrically conductive stress relief insert in said cavity and connected to said insulating housing;
an electrical connector located within said hollow stress relief insert;
an electrical cable extending through each of said passages into said hollow stress relief insert and having an electrical conductor electrically and mechanically connected to said electrical connector;
and a heat transfer device discrete from said housing and surrounding and engaging said electrical connector and engaging said stress relief insert, said device being fabricated of elastic material which is electrically conductive and thermally conductive,
said device being hollow and having spaced apart radially outwardly extending projections on the exterior thereof engaging said stress relief insert and having a slit extending lengthwise thereof to enable it to be disposed around said connector.

* * * * *